United States Patent [19]

Watson

[11] 3,918,031

[45] Nov. 4, 1975

[54] DUAL MODE BULK MEMORY EXTENSION SYSTEM FOR A DATA PROCESSING

[75] Inventor: William J. Watson, Austin, Tex.

[73] Assignee: Texas Instruments Incorporated, Dallas, Tex.

[22] Filed: Oct. 23, 1973

[21] Appl. No.: 408,342

Related U.S. Application Data

[63] Continuation of Ser. No. 176,383, Oct. 26, 1971, abandoned.

[52] U.S. Cl. .............................................. 340/172.5

[51] Int. Cl.[2] .......................................... G06F 15/16

[58] Field of Search ...................... 340/172.5; 445/1

[56] References Cited

UNITED STATES PATENTS

| | | | |
|---|---|---|---|
| 3,440,612 | 4/1969 | Womack | 340/172.5 |
| 3,445,820 | 5/1969 | Wissick | 340/172.5 |
| 3,449,723 | 6/1969 | Anderson et al. | 340/172.5 |
| 3,449,724 | 6/1969 | Boland et al. | 340/172.5 |
| 3,477,063 | 11/1969 | Anderson et al. | 340/172.5 |
| 3,512,136 | 5/1970 | Harmon et al. | 340/172.5 |
| 3,573,852 | 4/1971 | Watson et al. | 340/172.5 |

*Primary Examiner*—Mark E. Nusbaum
*Attorney, Agent, or Firm*—Harold Levine; Rene'E. Grossman; Thomas G. Devine

[57] ABSTRACT

A dual mode random access bulk memory extension in a first mode is in the address range of central memory and may be directly addressed through a memory control unit. In a second mode blocks of data may be transferred at high speed between the random access bulk memory and central memory.

3 Claims, 3 Drawing Figures

Inventor:
William G. W

Attorney:
Jim Comfort

DUAL MODE BULK MEMORY EXTENSION SYSTEM FOR A DATA PROCESSING

This is a continuation, of application Ser. No. 176,383, filed Oct. 26, 1971 now abandoned.

This invention relates to electronic digital computers and more specifically to a dual-mode bulk random access memory extension configured to supplement memory and provide a means of rapid transfer of data into high-speed central memory as memory space becomes available for additional programs in a multiprogramming environment. This device was conceived to function in an advanced scientific computer but increases the efficiency of data organization and file management in any multiprogramming computer system.

In a first mode the bulk memory extension serves simply to supplement high-speed central memory with a slower, but more economical bult memory extension. The bulk memory is in the address range of central memory and is thus accessible in random fashion by any processor or device in communication with the memory control unit.

Each program when transferred into memory for execution may be partitioned with data accessed frequently during program execution being assigned to central memory and data accessed very infrequently being assigned to the bulk memory extension such that central memory is utilized efficiently with only a small loss of execution speed. A reference which discusses the operation of computing systems utilizing memory hierarchies is "Performance Evaluation of Computing Systems with Memory Hierarchies" by Wilhelm Anacker and Chu Ping Wang, IEEE Transactions on Computers, Vol. EC-16, No. 6, Dec. 1967.

In multiprogrammed computing systems, several separate programs are typically resident in central memory during execution at any given time. The portion of central memory occupied by a program is made available upon termination of that program and it is desirable for efficient operation of the central processor to fill this available space with other program data in as short a time as possible. In the second mode operation blocks of data are transferred at high speed between the bulk memory extension and central memory by means of a data controller channel. In present multiprogrammed data processing systems programs which have been preprocessed and are awaiting memory space for execution are typically stored on a slow access device such as a disc and then buffered into a memory unit, using a portion of central memory for the buffer. The dual-mode bulk memory extension eliminates this requirement for using central memory as a buffer and thus creates a highly efficient means of file management.

Each channel of communication with the dual mode bulk memory extension, that is, through the data channel for block data transfer and through the standard interface for random access transfer, is accessed through the memory control unit which allows the two channels to form a closed communication loop around the memory extension. With this configuration data may be reorganized within the memory extension without requiring any central or other memory for buffer space, another process unique to this invention which allows high efficiency in data management.

It is therefore an object of this invention to provide a new and improved dual mode bulk memory extension for a data processing system.

Another object of this invention is to provide a new and improved random access bulk memory extension adapted for direct addressing in a data processing system and for high speed data transfer to and from central memory.

For a more complete understanding of the invention and for further objects and advantages thereof, reference may now be had to the following description taken in conjunction with the accompanying drawings in which.

In order to describe the present invention an advanced scientific computer system of which the present invention forms a part, will first be described generally, and then individual components in the role of the present invention and its interaction with other components of the system will be explained.

Figure 1:
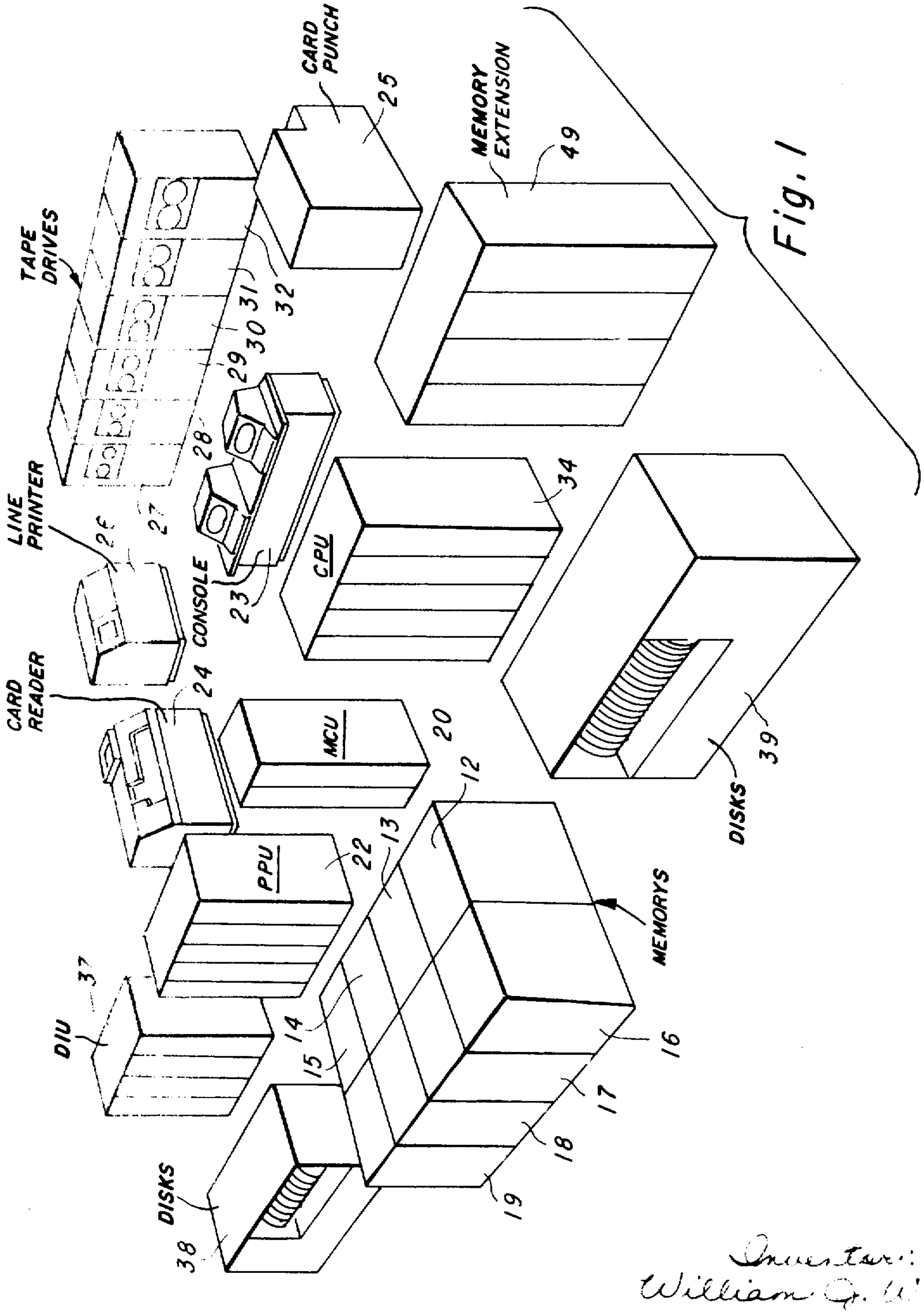
FIG. 1 illustrates an arrangement of the computer components to which the present invention may apply.

Referring now to FIG. 1, the computer system includes a central processing unit (CPU) 34 and a peripheral processing unit (PPU) 22. Memory is provided for both CPU 34 and PPU 22 in the form of eight modules of active element random access memory units 12–19. Such storage units may be of the type known in the art. In the form illustrated, each of the storage modules provides 16,384 32-bit words.

The memory provides for 140 nanosecond cycle time, and on the average, 120 nanosecond access time. Each memory access results in the transfer of information in groups of 8 32-bit words, hereinafter referred to as an octet. Thus, each memory module 12–19 is partitioned into 2048 octets.

In addition to storage modules 12–19, rapid access disc storage modules 38 and 39 are provided wherein the access time on the average is about 16 milliseconds.

A memory control unit 20 is provided for control of memory operations, access and storage. The CPU 10 and the memory control unit 18 shown in U.S. Pat. No. 3,573,851, issued on Apr. 6, 1971 and assigned to the assignee of this invention correspond respectively to CPU 34 and memory control unit 20 of this invention and may be referred to for more detail.

A card reader 24 and a card punch unit 25 are provided for input and output. In addition, tape units 27–32 are provided for input/outut (I/O) purposes as well as storage. A line printer 26 is also provided for output service under the control of the PPU 22. The elements of the computer are interconnected by cables.

It is to be understood that the processor system thus has a memory or storage hierarchy of five levels. The most rapid access storage is in the CPU 34 which has nine octet buffers, each octet consisting of 256 bits. The next most rapid access is in the active element memory units 12–19. The next most rapid access is in the bulk memory extension 49. The next most available storage is the disc storage units 38 and 39. Finally, the tape units 27–32 complete the storage array.

A twin-cathode-ray tube (CRT) monitor console 23 is provided. The console 23 consists of two adapted CRT-keyboard terminal units which are operated by the PPU 22 as input/output devices. It can also be used through an operator to command the system for both hardware and software checkout purposes and to interact with the system in an operational sense permitting the operator through the console 23 to interrupt a given program at a selected point for review of any operation, progress or results, and then to determine the succeeding operation. Such operations may involve the further processing of the data or may direct the unit to undergo a transfer in order to operate on a different program or on different data.

Figure 2:
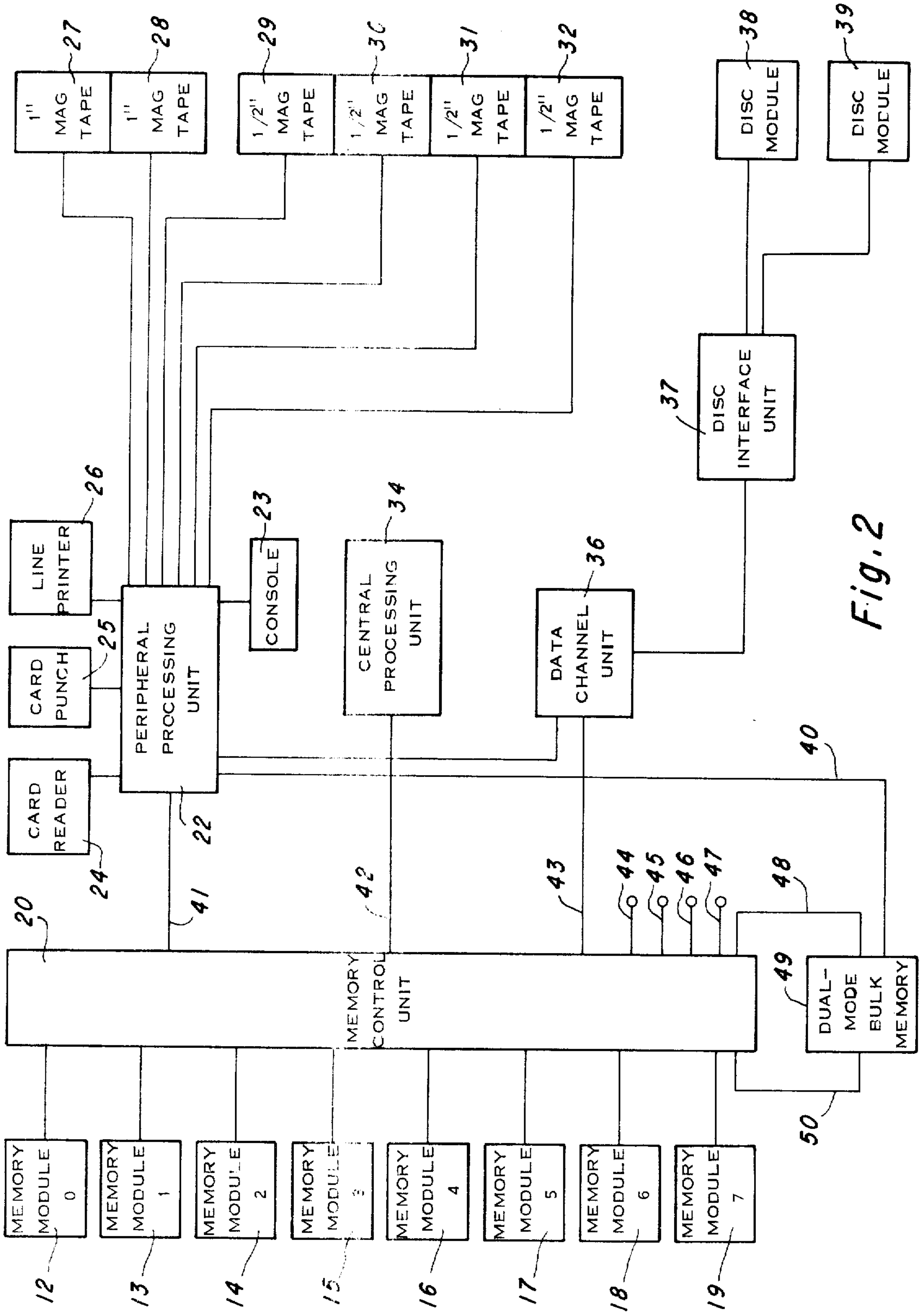
FIG. 2 is a block diagram of the system of FIG. 1.

There will now be described in a general manner the organization of the computer system by reference to FIG. 2. Memory modules 12–19 are controlled by the memory control unit 20 in order to input or output octets of data to and from the memory modules. Memory control unit 20 provides gating, mapping and protection of the data within the memory stacks as required.

A signal bus 43 extends between the memory control 20 and data channel unit 36 which is connected to the discs 38 and 39 by way of a disc interface unit 37. Each disc module has a capacity of 25 million words. The data channel unit 36 and the disc interface unit 37 support the disc units 38 and 39. The data channel unit 36 is a simple wired program computer capable of moving data to and from memory discs 38 and 39 through the disc interface unit 37. Upon command only, the data channel unit 36 may move memory data from the discs 38 and 39 via the bus 43 through the memory control unit 20 to the memory modules 12–19. The channel unit 30 of U.S. Pat. No. 3,573,852 should be referred to for details of units 36 and 37 of this invention.

Bidirectional channels extend between each disc 38 and 39 and the disc interface unit 37. One data word at a time is transmitted between a disc unit 38 and 39 and the data channel unit 36 through the disc interface 37. Data from memory stacks 12–29 are transmitted to and from data channel 36 in the memory control unit 20 in eight-word blocks.

A single bus 41 connects the memory control unit 20 with the PPU 22. PPU 22 operates all I/O devices except the discs 38 and 39. Data from the memory modules 12–19 are transferred to and from the PPU 22 via a memory control unit 20 in eight word blocks.

When read from a memory module 12–19, a read/restore is carried out in the memory module 12–19. The eight words are "funneled down" in the PPU 22 with only one of the eight words being used within the PPU 22 at a time. Such funnelling down of data words within the PPU 22 is desirable because of the relatively slow usage of data required by the PPU 22 and the I/O devices as compared with the CPU 34. A typical available word transfer rate for an I/O device controlled by the PPU 22 is about 100 kilowords per second.

The PPU 22 contains eight virtual processors therein, the majority of which may be programmed to operate various ones of the I/O devices as required. The tape units 27 and 28 operate a 1 inch wide magnetic tape, while tape units 29–32 operate with one-half inch magnetic tapes to enhance the capabilities of the system.

The virtual processors in the PPU 22 take instructions from the central memory and operate upon these instructions. The virtual processors include program counters and a time-shared arithmetic unit in the peripheral processing unit. The virtual processors execute programs under instruction control. The PPU 22 and the virtual processors are described in more detail in U.S. Pat. No. 3,573,852 for "Variable Time Slot Assignment of Virtual Processors," assigned to Texas Instruments Incorporated.

The PPU 22 operates upon the program contained in memory and executed by virtual processors in an efficient manner and additionally provides monitoring controls to the programs being run in the CPU 34.

CPU 34 is connected to memory stacks 12–19 through the memory control 20 via a bus 42. The CPU 34 may utilize all eight words in an octet provided from the memory modules 12–19. Additionally, the CPU 34 has the capability of reading or writing any combination of those eight words. Bus 41 handles three words every 60 nanoseconds, two words input to the CPU 34 and one word output to the memory control unit 20.

Buses 44–47 are provided from the memory control unit 20 to be utilized when the capabilities of the computer system are to be enlarged by the addition of other processing units and the like.

Each of the buses 41–48 is independently gated through the memory control unit 20 to each memory module 12–19 thereby allowing memory cycles to be overlapped to increase processing speed. A fixed priority preferably is established in the memory controls to service conflicting requests from the various units connected to the memory control unit 20. The internal memory control unit 20 is given the highest priority with the external buses 43, 41, 42, 48 and 44–47 being serviced in that order. The external bus processor connectors are identical, allowing the processors to be arranged in any other priority order desired.

The dual mode bulk memory unit 49 is connected to the memory control unit 20 by means of busses 50 and 48. The maximum data rates over busses 48 and 50 is 40 megawords per second. Data in the dual mode bulk memory unit 49, transferred via bus 50, is in the address space of the high speed memory modules 12–19, and randomly accessed, 8 words per fetch cycle. Data may be moved to and from the dual mode bulk memory unit 49 via bus 50 in a random access fasion from any processor located on buses 41–48 which includes the bulk memory unit itself. Blocks of contiguous data are moved to and from the dual mode bulk memory unit 49 over bus 48 to and from any memory module 12–19 by control of a data channel built into the bulk memory unit 49. The data channel unit built into the bulk memory unit 49 is initiated by the PPU 22 by communication via bus 40.

In typical operation, programs awaiting execution on the discs 38 and 39 are moved by control of the data channel unit 36 through bus 43 by way of memory control unit 20 and through bus 50 to the dual mode bulk memory unit 49. When storage becomes available in the high speed memory, consisting of modules 12–19, regions of data can be transferred at 40 megawords per second from the bulk memory unit 49 by way of bus 48 under control of the memory control unit 20 to any one of the memory modules 12–19. This action is controlled exclusively by the PPU 22.

Figure 3:
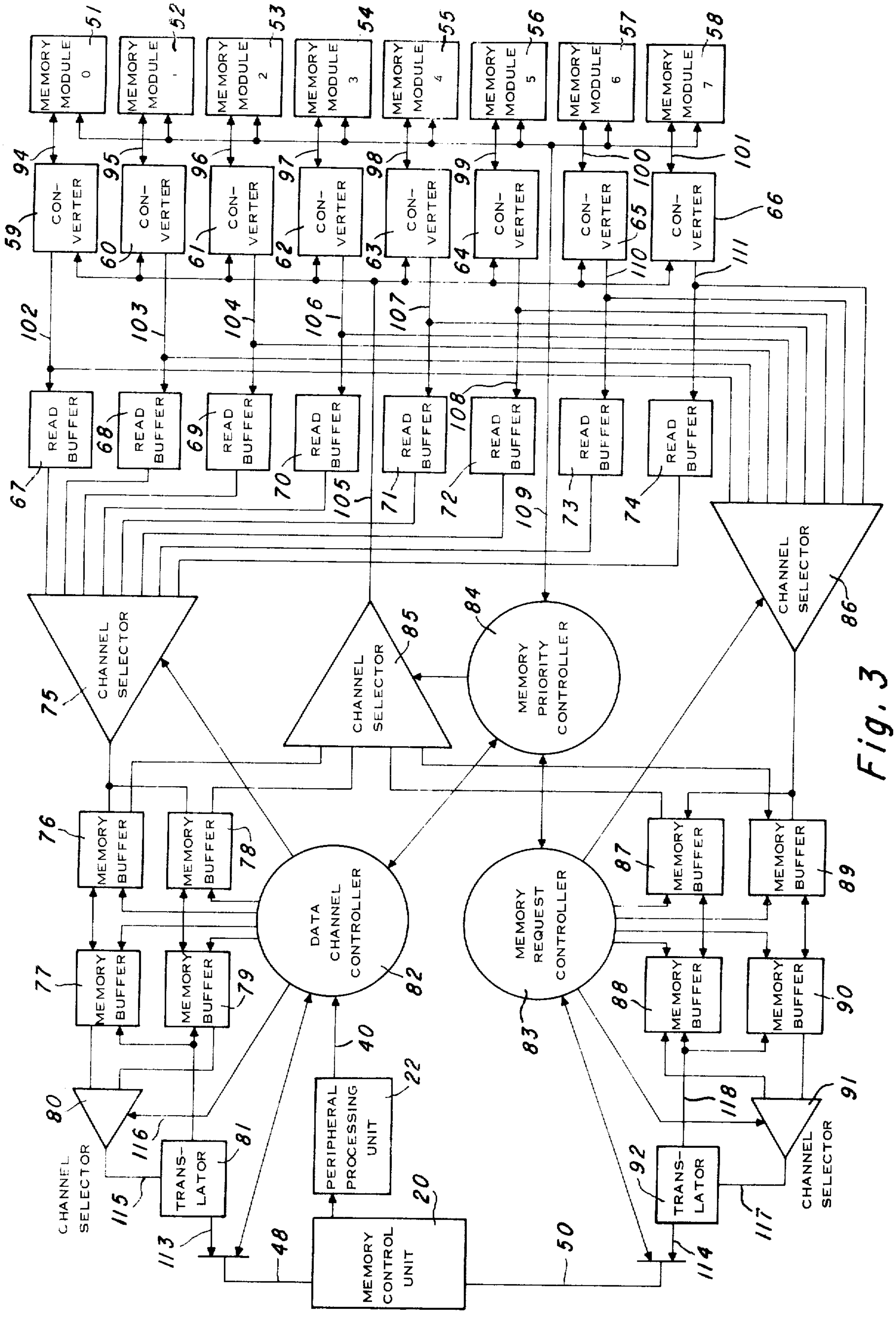
FIG. 3 is a more detailed diagram representing the dual mode bulk memory extension unit.

In accordance with the present invention the dual mode bulk memory unit 49 is more fully described in FIG. 3. Block data transferred via bus 48 is controlled by the data channel controller 82. Data control channel 82 is a gated sequential control device which operates in a manner known in the art and contains eight 32-bit registers. The data channel controller 82 sends addressing and control information to the memory control unit 20 via bus 48 for the transfer of block data to or from central memory (modules 12–17 as shown in FIG. 2). After initiation by a flag bit in the PPU 22 which is sensed via bus 40 the data channel controller 82 fetches the contents of a dedicated location in central memory which is the address of the first of one or more block data transfer "programs." Each program contained in eight 32-bit words, is transferred to the eight registers in the data channel controller 82. The PPU 22 may establish any number of programs to await processing by the data channel controller 82 which are configured in memory in a linked list fashion. The following table shows the contents of the data transfer program transferred to and stored in the eight registers which control the block data transfers between central memory via the memory control unit 20 and the bus 48.

| REGISTER | CONTENTS |
|---|---|
| 1 | Address of next program octet |
| 2 | Starting address of data to transfer to/from central memory |
| 3 | Starting address of data to transfer to/from dual-mode bulk memory |
| 4 | STATUS (busy or not busy) |
| 5 | |
| 6 | Registers available for system software |
| 7 | |
| 8 | |

Register 1 indicates the end of the linked list of program octets when its contents is all zeroes.

The data channel controller 82 provides the control necessary to move blocks of data via bus 48 to/from the memory buffers 76–79 through channel selectors 75 and 80. The data channel controller 82 sends addressing information to the memory priority controller 84 when data is to be transferred between memory modules 51–58 via bus 48.

The memory request controller 83 is a gated element whose operation is known in the art which receives addressing and control bulk via bus 50 and provides control for data transfer via bus 50 to and from memory modules 51–58. All data transferred to/from memory modules 51–58 via bus 50 is randomly accessed and is in the address space of central memory (memory modules 12–19 in FIG. 2). The memory request controller 83 directs the operation of the channel selectors 86 and 91, and the memory buffers 87–90 as data is transferred via bus 50, and signals the memory priority controller on each clock pulse in which reading or writing of data in memory modules 51–58 is desired.

Channel selectors 80, 75, 91, 85, and 86 are simple gated fan-in networks which have the function of selecting the desired data path as determined by the data channel controller 82 and the memory request controller 83. Channel selectors 75 and 86 are used in the reading of data and channel selector 85 is used in writing of data in memory modules 51–58.

Each of the translators 81 and 92 serve to interface between the half duplex buses 113 and 114 and the simplex buses 115–118 and provide the logic level change necessary between the ECL-level logic used in the memory control unit 20 and the TTL-level logic used in the memory buffers 76–79 and 87–90.

Two sets of four memory buffers 76–79 and 87–90 serve as interface data buffers between the memory control unit 20 and memory modules 51–58. The configuration of two sets of double buffers allows the maximum data rate of 40 megawords per second to be consistent with the bandwidth of the memory extension electronics.

All data transferred to or from the memory modules 51–58 pass through bus interface convertors 59–66 which function to interface the half duplex buses 94–101 and the simplex buses 102–112.

Data transferred from memory modules 51–58 during one clock pulse is stored in the read buffers 67–74 so that the data read is not lost if the operation on the succeeding clock pulse is a write, which would effect the transfer of data into memory modules 51–58.

The memory priority controller 84 is a simple gated network which operates in a manner known in the art which controls the addressing of data from memory modules 51–58 and resolves any simultaneous requests by both the memory request controller 83 and the data channel controller 82 affecting data in the same memory module. In all cases of coincidence of request by both controllers, priority is given to the memory request controller 83 and the request from the data channel controller 82 is delayed for one clock pulse, each clock pulse being 200 nanoseconds. However, the memory priority controller 84 may serve simultaneous requests by both the data channel controller 82 and the memory request controller 83 if the addressing involved does not operate on data in the same memory module. The logical implementation of units 82, 83 and 84 is similar to that illustrated throughout U.S. Pat. 3,573,852.

Memory modules 51–58 are metal oxide semiconductor memory elements known in the art which contain 131,672 32-bit words of storage each and have access time of 0.7–1.6 usec. Each of the buses 94–101 is independently gated to each memory module 51–58 thereby allowing memory cycles to be overlapped to increase processing speed.

Having described the invention in connection with certain specific embodiments thereof, it is to be understood that certain modifications may now suggest themselves to those skilled in the art and is intended to cover such modifications as fall within the scope of the appended claims.

What is claimed is:

1. A stored program data processing system comprising:

a. a random access central memory having a first predetermined access time for storing data therein;

b. a random memory extension having a second predetermined access time slower than the first predetermined access time for storing data therein;

c. a plurality of data processors;

d. memory control means having data channels connecting said data processors and said central memory to said memory control means said memory control means permitting the accessing of said central memory and said memory extension asynchronously and selectively by each of the plurality of data processors;

e. a first data channel connecting said memory extension to said memory control means;

f. a second data channel connecting said memory extension to said memory control means;

g. a data channel controller for controlling the block transfer of data through said first data channel and said memory control means between said central memory and said memory extension; and h. a memory request controller, responsive to said plurality of data processors and to said memory extension, for controlling the transfer of data through said second data channel and said memory control means between said processors and said memory extension.

2. The data processing system claimed in claim 2, including a memory priority controller for establishing priority of access to said memory extension by said data channel controller and said memory request controller.

3. The data processing system claimed in claim 2 including a first memory buffer between said first data channel and said memory extension and a second memory buffer between said memory extension and said second data channel.

* * * * *